United States Patent [19]
Ninacs et al.

[11] Patent Number: 5,378,026
[45] Date of Patent: Jan. 3, 1995

[54] CYLINDRICAL FLEXIBLE JOINT UNIT

[75] Inventors: Michel D. Ninacs, 1200 McGill College, Suite 1100, Montreal, Quebec H3B 4G7; Rodney P. Bell, Campbellville, both of Canada

[73] Assignee: Michel D. Ninacs, Vaudreuil, Canada

[21] Appl. No.: 111,701

[22] Filed: Aug. 9, 1993

[51] Int. Cl.⁶ .............................................. F16L 55/00
[52] U.S. Cl. ..................................... 285/47; 285/229; 285/286
[58] Field of Search ................. 285/47, 229, 226, 114, 285/286

[56] References Cited

U.S. PATENT DOCUMENTS

| | | | |
|---|---|---|---|
| 4,047,740 | 9/1977 | Young et al. | 285/47 |
| 4,174,123 | 11/1979 | Schluderberg | 285/47 |
| 4,219,224 | 8/1980 | Hanley | 285/47 |
| 4,299,414 | 11/1981 | Bachmann | 285/229 |
| 4,848,803 | 7/1989 | Bachmann | 285/229 X |

FOREIGN PATENT DOCUMENTS 9007081  6/1990  WIPO .................... 285/47

*Primary Examiner*—Dave W. Arola

[57] ABSTRACT

A cylindrical flexible joint unit for interconnecting a hot gas duct of circular cross-section to a further duct structure of circular cross-section. The flexible joint unit comprises an inlet annular flexible wall structure for connection to the hot gas duct and an outlet flexible annular connector. Heat insulating material is retained between the annular wall structures and an outer flexible annular membrane. The inlet wall structure has a cylindrical inner sleeve and an annular step connecting flange secured about an outer surface of the sleeve. The inner sleeve has a duct connecting end and a free end. The step connecting flange has a short transverse connecting wall and an elongated annular spaced wall section extending from the connecting wall, and disposed substantially parallel above the outer surface of the inner sleeve toward the duct connecting end to define an air gap therebetween. A membrane connecting bracket extends above a free end of the wall section to connect with a side edge of the annular membrane thereabove. The free end of the annular sleeve is displaceably disposed with relation to the outlet flexible connector. The annular connector has a duct connectingz end for connection to the duct of another structure, and has an opposed side edge of the annular membrane connected thereto.

19 Claims, 4 Drawing Sheets

_5,378,026_

CYLINDRICAL FLEXIBLE JOINT UNIT

TECHNICAL FIELD

The present invention relates to a cylindrical flexible joint unit for interconnecting a hot gas flue duct, such as a gas turbine engine exhaust duct to a duct of another structure, and capable of withstanding thermal shock due to the quick rise in temperature.

BACKGROUND ART

Ducting expansion joints are usually flexible connectors which are designed to provide stress relief in ducting systems to absorb movement in the component parts of the ducting caused by thermal changes. Such ducting expansion joints also act as vibration isolators and compensate for minor misalignment of interconnecting ducts. Such expansion joint structures are also fabricated from a variety of metallic or non-metallic materials including synthetic elastomers, fabrics, insulation materials, and plastics, depending on the designs. Such ducting expansion joints also find many applications, such as in smelters, refuse incineration and power generation plants, such as coal-or oil-fired plants, gas turbine plants, coal/oil/gas cogeneration plants, nuclear power plants, and also in pulp and paper plants and refineries, foundries, steel mills, etc.

SUMMARY OF INVENTION

The expansion joint of the present invention was designed specifically for interconnecting cylindrical ducting of circular cross-section, such as those found in power generation plants utilizing gas-fired turbine engines which can develop heat rises in the range of 700° F. in the first few seconds of operation and up to about 1000° F. in less than one minute. Such abrupt temperature changes cause thermal stress in the metal pieces utilized in the construction of these flexible joints due to the differential of expansion between the inside hot surface of the materials to their cooler outside surface or to outer connecting metal parts.

It is a feature of the present invention to provide a cylindrical flexible joint unit of circular cross-section having metal components for interconnecting a circular hot gas duct to a further duct of another structure, and which is capable of absorbing thermal shock and differential of expansion of the metal due to the fast temperature rise of the flue gas passing through the ducts.

Another feature of the present invention is to provide a cylindrical flexible joint unit of circular cross-section having an inner annular flexible wall structure with an inner cylindrical sleeve and an annular step connecting flange secured about the outer surface of the sleeve and forming an annular air space between the inner sleeve and the step connecting flange, which step shape design provides substantial stress level reduction as compared to prior art designs.

According to the above features, from a broad aspect, the present invention provides a cylindrical flexible joint unit for interconnecting a circular hot gas duct of circular cross-section to a further circular cross-section duct of another structure. The unit comprises an inlet annular flexible wall structure for connection to the hot gas duct and an outlet flexible annular connector. Heat insulating means is retained between the annular wall structures and an outer flexible annular membrane. The inlet wall structure is a metal wall of suitable metal and defines a cylindrical inner sleeve and an annular step connecting flange secured about an outer surface thereof. The inner sleeve has a duct connecting end and a free end. The step connecting flange has a short transverse connecting wall and an elongated annular spaced wall section extending from the connecting wall and disposed substantially parallel above the outer surface of the inner sleeve toward the duct connecting end of the inner sleeve and defines an air gap therebetween. A membrane connecting bracket extends above a free end of the spaced wall section to connect with a side edge of the annular membrane thereabove. The free end of the annular sleeve is displaceably disposed with relation to the outlet flexible annular connector. The annular connector has a duct connecting end for connection to the duct of another structure and has an opposed side edge of the annular membrane connected thereto.

According to a further broad aspect of the present invention the outlet flexible annular connector is a cold flange connector provided with a cylindrical coupling.

According to a still further broad aspect of the present invention the outlet flexible annular connector is also a hot flange connector constructed similarly to the inlet flexible wall structure.

BRIEF DESCRIPTION OF DRAWINGS

A preferred embodiment of the present invention will now be described with reference to the accompanying drawings in which.

DESCRIPTION OF PREFERRED EMBODIMENTS

Figure 1:
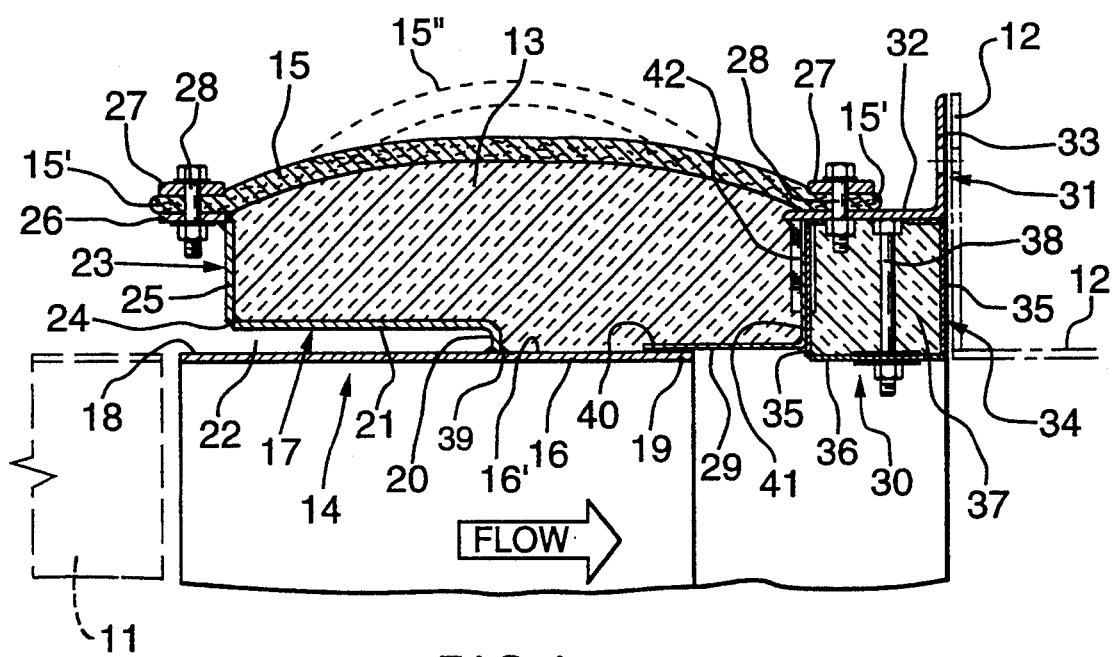
FIG. 1 is a cross-section view illustrating the construction of a cylindrical flexible joint unit of the present invention and having a hot and cold flange connection.
Figure 2:
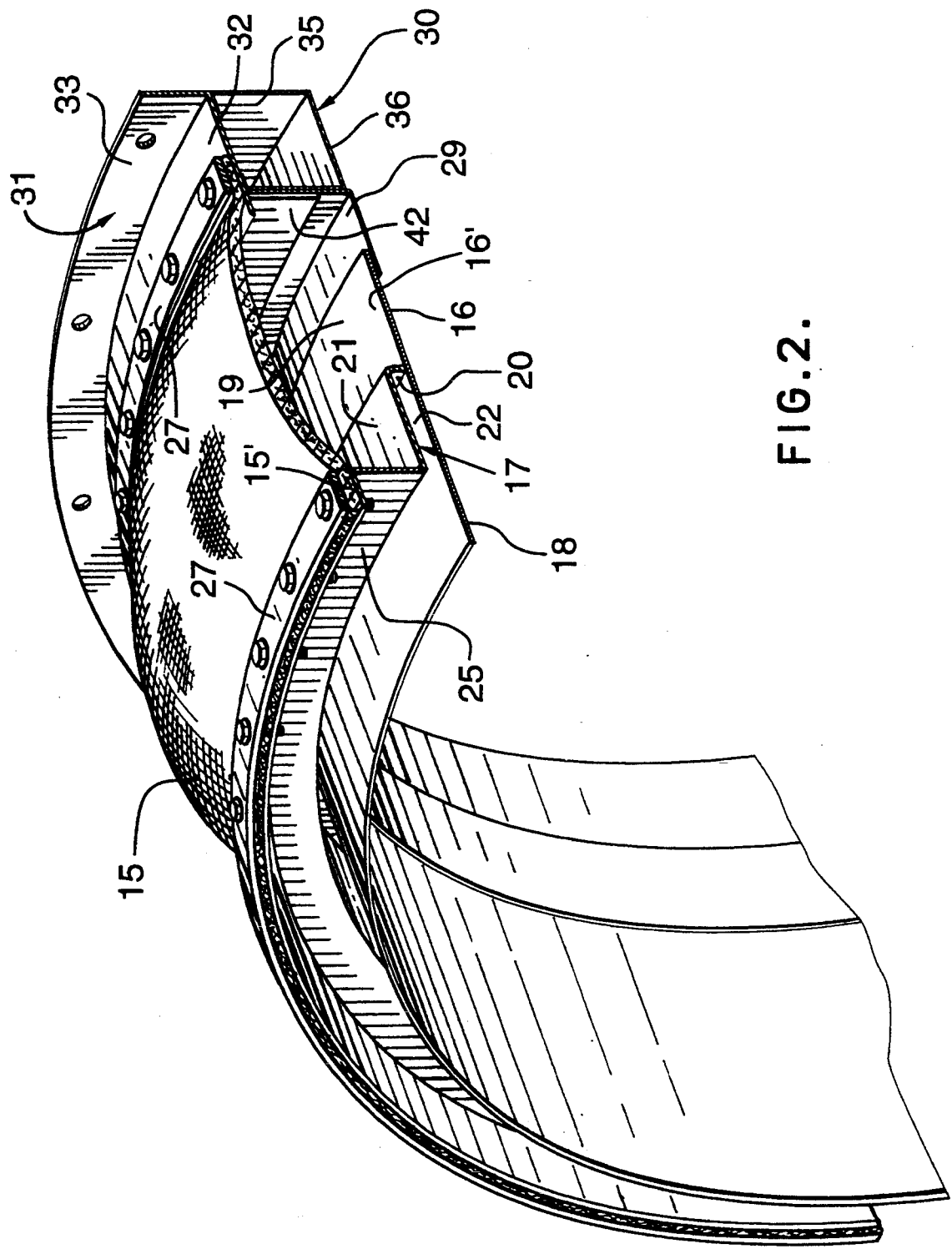
FIG. 2 is an enlarged fragmented perspective view showing the construction of a cylindrical flexible joint unit of the present invention.

Referring now to the drawings, and more particularly to FIGS. 1 and 2, there is shown generally at 10 the cylindrical flexible joint unit of the present invention for interconnecting a circular hot gas duct 11, such as the outlet duct of a gas turbine engine (not shown), to a circular duct 12 of another structure. It is pointed out that the flexible joint unit of the present invention is not necessarily restricted to connecting the outlet ducts of turbine engines, but may be used, where suitable, for connecting any circular outlet structure of a hot flue gas or hot air to the inlet of another circular structure or apparatus, and where the flexible expansion joint unit 10 is subjected to thermal shock and differential of expansion due to its exposure to a quick rise in temperature, such as for example, a heat rise of about 700° F. in a few seconds and up to 1000° F. in less than one minute, as is customary with gas turbines. In the flexible joint arrangement, as shown in FIG. 1, the unit is structured for connecting a "hot flange", and the turbine outlet to a "cold flange" such as that of a duct.

As herein shown, the cylindrical flexible joint unit 10 is of circular cross-section and comprises a heat insulating body 13 which may be formed of a ceramic wool packing, or other suitable heat insulating material, and retained between an inner annular flexible wall structure 14 and an outer flexible annular bellow 15. The flexible wall structure 14 is constructed of metal, herein Armco #409 stainless steel (Registered Trademark), which has been found adequate for this use. The wall structure defines a cylindrical circular cross-section inner sleeve 16 and an annular step connecting flange 17 which is secured about an outer surface 16' of the inner sleeve. The inner sleeve 16 has a duct connecting end 18 which is usually welded to an outlet duct, such as shown at 11, provided at the hot end of a turbine engine (not shown). The other end of the sleeve is a free end 19. Immediately upon starting the turbine engine the wall structure 14 and particularly the sleeve 16 is subjected to thermal shock.

Figure 4:
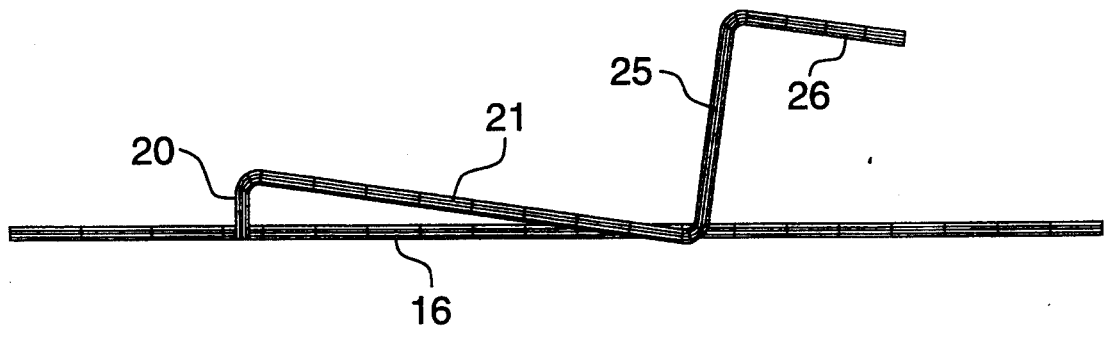
FIG. 4 is a section view similar to FIG. 3, but showing the inner annular flexible wall structure in its maximum deformed shape.

As herein shown, the step connecting flange 17 has a short transverse connecting wall 20 and an elongated annular spaced wall section 21 extending from the connecting wall 20, and disposed substantially parallel above the outer surface 16' of the inner sleeve 16 extending towards the duct connecting end 18 of the inner sleeve. An air gap 22 is defined between the outer surface 16' of the inner sleeve 16 and the annular spaced wall section 21, and no insulation material is provided in this gap. The gap provides for the flexion, as shown in FIG. 4, and heat transfer.

A bellow or membrane connecting bracket 23 is secured by a weld 24 to the free end of the annular space wall section 21. This connecting bracket could also be integrally formed with the wall section 21. The bracket is an L-shaped bracket having a transverse connecting wall 25 and a right-angle connecting end wall 26. An elongated side edge section 15' of the membrane or bellow 15 is clamped over the connecting end wall 26 by a clamping bar 27 and fasteners 28.

As shown in FIGS. 1 and 2, the free end section 19 of the annular sleeve is displaceably disposed above or below an inner surface of a cylindrical metal end wall 29 of an insulated support frame structure 30. This insulated frame structure 30 comprises a connecting flange 31 having a bellow connecting web 32 and a duct connecting web 33. An insulating housing 34 isolates the connecting flange 31 from the hot gases flowing through the unit 10. The housing 34 is a channel housing having opposed parallel side walls 35 and an end wall 36. A ceramic wool insulating packing 37 is housed within the housing 34. Connecting bolts 38 connect the housing to the flange.

As can be seen, the metal end wall 29 is an L-shaped annular stainless steel ring having a wall section 40 extending over the heat insulating body 13 and coextensive with the cylindrical inner sleeve 16 of the flexible wall structure 14. A transverse attachment flange 41 is formed by the other section of the "L" and it is sandwiched between a side wall 35 of the housing 34 and a seal retainer transverse bar 42 connected to the bellow connecting web 32. The inner wall surface 40 of the end wall 29 is held against the heat insulating body 13

The other elongated side edge 15' of the bellow 15 is clamped to the web 32 by the clamp bar 27 and fastener 28. The annular bellow is a heat resistant fabric-like flexible sheet capable of flexing, as shown at 15", when the inner annular flexible wall structure 14 deforms or flexes when subjected to thermal shock.

As shown, the transverse wall 20 of the annular step connecting flange 17 is secured to the cylindrical inner sleeve 16 by a weld 39. This weld 39 is a locally highstressed area of the flexible wall structure and the weld thickness reduces stress in this area of the sleeve inner wall 16. The design of the annular flexible wall structure, as herein shown, produces about the lowest stress level, and radiation heat transfer takes place across the angular gap 22. Tests have been made, and demonstrated that maximum peak stress occurs at about 3600 seconds after the start of a temperature transient, and such deformation in the inner annular flexible wall structure is illustrated by FIG. 4. FIG. 4 is a computer-generated reproduction showing elastic behavior of the inner annular flexible wall structure 14 at stress levels well in excess of the yield of the metal. Accordingly, the wall structure 14 will not be subjected to such behavior under normal applications. Axial stress distribution shows that the high bending stress is present at the weld 39 and at the outer flange 23. The axial stress drops quickly away from the weld 39. The cylindrical wall structure stress approaches 0 at the weld, but is high at the free end 19. It is generally in compression along the duct, except at the free end, and in tension in the flange. The average stress has been found to be largest in the flange, and there are significant bending effects at the weld.

Figure 3:
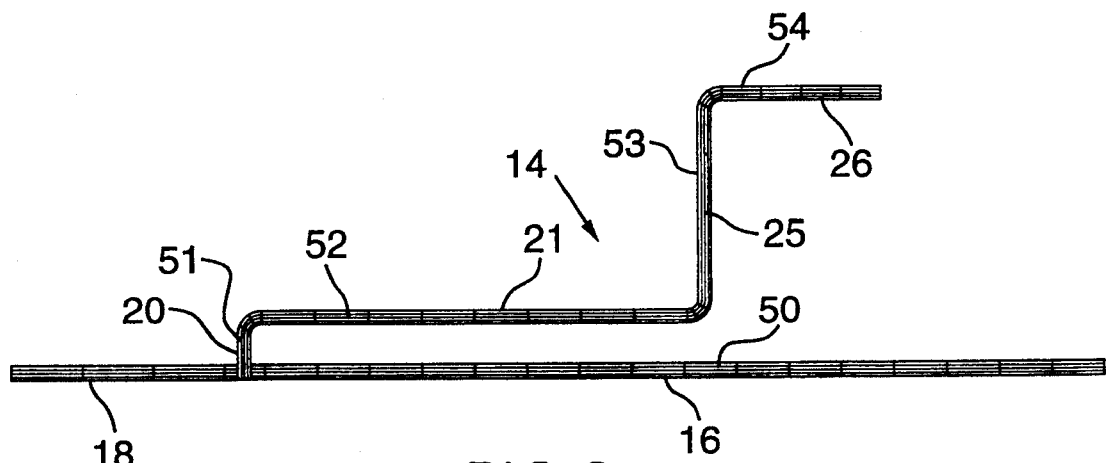
FIG. 3 is a computer-generated cross-section view of the design or shape of the inner annular flexible wall structure.
Figure 5:
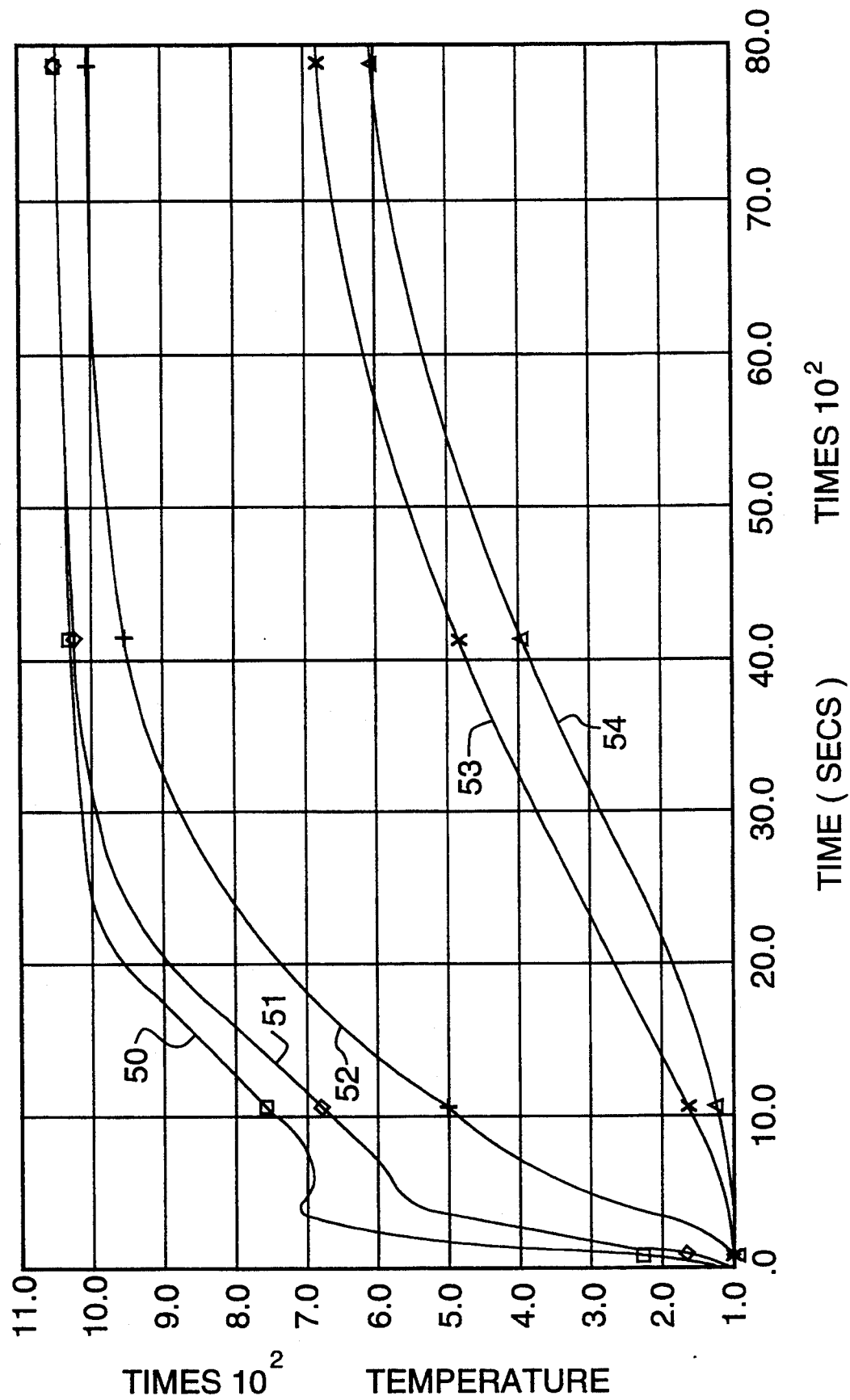
FIG. 5 shows temperature transient curves taken at five different locations of the main component parts of the inner annular flexible wall structure, as shown in FIG. 3.

FIG. 5 illustrates temperature transient curves at various points along the annular flexible wall structure 14 of the present invention. The reference numerals appearing on FIG. 3 indicate the points at which the temperature was measured on the annular flexible wall structure 14, and these reference numerals also appear on FIG. 5 to identify the transient curves associated with these points.

.As above described, the metal selected for the construction of the inner annular flexible wall structure is Armco #409 stainless steel, and its yield stress is given as 35,000 psi at room temperature. This steel has good resistance to oxidation and corrosion, and it is non-hardenable by heat treatment because of its titanium content. The titanium addition to the steel also stabilizes the grade to prevent hardening during welding. Other suitable steel material may also be used, as well as insulating materials for the packings 13 and 37. As also earlier described, the flexible joint unit may have various other applications.

Figure 6:
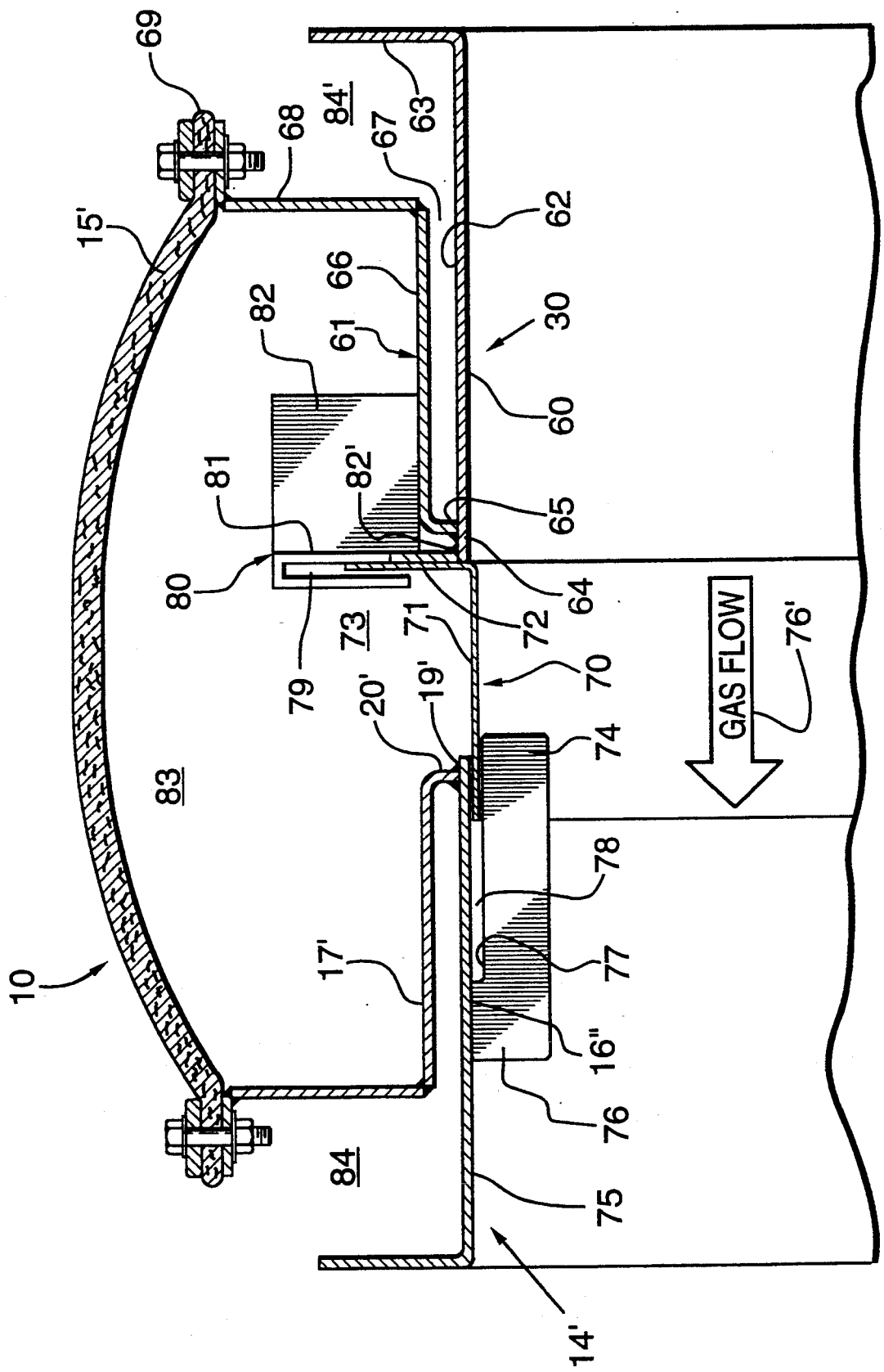
FIG. 6 is a cross-section view illustrating the construction of a cylindrical flexible joint unit of the present invention and having opposed hot flange connections.

Referring now to FIG. 6, there is shown a further embodiment of the flexible joint unit 10' of the present invention. As herein shown, the outlet flexible annular connector 30' is constructed similarly to the inlet flexible wall structure 14'. The outlet flexible annular connector 30' has a cylindrical inner sleeve 60 and an annular step connecting flange 61 secured about an outer surface 62 of the inner sleeve 60. The inner sleeve 60 has a duct connecting end provided with a transverse connecting flange 63 and a free end 64.

The step connecting flange 61 has a short transverse connecting wall 65 and an elongated annular spaced wall section 66 extending from the connecting wall 65 and disposed substantially parallel above the outer surface 62 of the inner sleeve 60 toward the duct connecting end of the inner sleeve. An air gap 67 is defined between the inner sleeve 60 and the spaced wall section 66. A membrane connecting bracket 68 extends above the free end of the spaced wall section 66 to connect with a side edge 69 of the annular membrane 15'. A cylindrical coupling 70 is retained between the free ends 64 and 19' of the annular sleeves 60 and 16" of the outlet flexible annular connector 30' and the inlet annular flexible wall structure 14'. As herein shown, these free ends 64 and 19' are short end walls extending a short distance beyond the transverse connecting wall 65 of the step flange 61 and the transverse connecting wall 20' of the step flange 17'.

The cylindrical coupling 70 is an L-shaped cross-section floating annular ring having a cylindrical horizontal wall 71 and a transverse end wall 72. The floating annular ring 70 is captively and movably retained across a gap 73 defined between the free ends 64 and 19' of both inner sleeves 60 and 16'. The inner sleeve 16" of the inlet annular flexible wall structure 14' is provided with two or more spaced connecting fins 74 secured to the inner surface 75 of the inner sleeve 16". The fins 74 have a securing end 76 to connect the fins extending axially of the inner sleeve and in the gas flow direction, as indicated by arrow 76. The fins have a gap forming section wherein a side edge 77 of the fin is paced a short distance adjacent a free end portion of the inner wall 75 to define a connecting gap 78. The horizontal wall 71 of the annular ring 70 is received and held for movement in this connecting gap.

The transverse end wall 72 of the annular ring 70 is received in a vertically disposed slot 79 of two or more, or a plurality of, inverted U-shaped clips 80 secured to the sleeve 60 on the outer side wall 62 thereof adjacent the free end 64. The U-shaped clips have a rectangular shape wall portion 81 defining the slot 79 and a transverse holding wall 82 which extends over the step connecting flange 61. The clips 80 are welded adjacent the free end of the sleeve over the outer side wall 62, as indicated by reference numeral 82'. As herein shown, the annular ring 70 interconnects the cylindrical inner sleeves through floating connectors. Although not shown, a heat insulating material is disposed within the cavity 83 similarly to the material 13, as shown in FIG. 1. Further heat insulating material is also disposed within the cavities 84 and 84' at opposed connecting ends of the cylindrical sleeves 60 and 16".

It is within the ambit of the present invention to cover any obvious modifications of the examples of a preferred embodiment described herein, provided such modifications fall within the scope of the appended claims.

We claim:

1. A cylindrical flexible joint unit for interconnecting a circular hot gas duct of circular cross-section to a further circular cross-section of another structure, said unit comprising an inlet annular flexible wall structure for connection to said hot gas duct and an outlet flexible annular connector, heat insulating means retained between said annular wall structure, said annular connector and an outer flexible annular membrane, said inlet wall structure being a metal wall and defining a cylindrical inner sleeve and an annular step connecting flange secured about an outer surface thereof, said inner sleeve having a duct connecting end and a free end, said step connecting flange having a short transverse connecting wall and an elongated annular spaced wall section extending from said connecting wall and disposed substantially parallel above said outer surface of said inner sleeve toward said duct connecting end of said inner sleeve and defining an air gap therebetween, a membrane connecting bracket connected to and extending above a free end of said spaced wall section to and connected with a side edge of said annular membrane thereabove, said free end of said annular sleeve being displaceably disposed with relation to said outlet flexible annular connector, said outlet annular connector having a duct connecting end for connection to said duct of another structure and having an opposed side edge of said annular membrane connected thereto.

2. A flexible joint unit as claimed in claim 1 wherein said outlet flexible annular connector is provided with a cylindrical coupling, said free end of said annular sleeve being disposed within an end of said cylindrical coupling and overlapping an inner cylindrical surface thereof.

3. A flexible joint unit as claimed in claim 2 wherein said membrane connecting bracket of said step connecting flange is an L-shaped bracket having a transverse connecting wall secured to said free end of said spaced wall section and a right angle connecting end wall.

4. A flexible joint unit as claimed in claim 3 wherein said annular membrane is clamped along said side edge between a clamping bar and said right angle connecting end wall, fasteners interconnecting said clamping bar to said right angle connecting end wall to provide clamping force, and a further clamping bar clamping said opposed side edge of said bellow to said insulated support frame structure, and also interconnected by fasteners to provide clamping force.

5. A flexible joint unit as claimed in claim 2 wherein said outlet flexible annular connector comprises a connecting flange having a membrane connecting web and a duct connecting web, an insulating housing isolating said connecting flange from hot gases flowing through said unit.

6. A flexible joint unit as claimed in claim 5 wherein said cylindrical coupling is an L-shaped annular stainless steel ring having a wall section extending over said heat insulating means and co-extensive to said cylindrical inner sleeve of said flexible wall, and a transverse attachment flange.

7. A flexible joint unit as claimed in claim 6 wherein said transverse attachment flange is secured in friction fit between a seal retainer transverse bar connected to said membrane connecting web and a side wall of said insulating housing, said insulating housing being secured to said membrane connecting web and extending thereunder with said side wall thereof in clamping engagement with said transverse attachment flange, said wall section of said annular stainless steel ring being held against said heat insulating means.

8. A flexible joint unit as claimed in claim 1 wherein said hot gas duct is an exhaust duct of a gas turbine engine.

9. A flexible joint unit as claimed in claim 1 wherein said another structure is a duct structure for convecting hot gases.

10. A flexible joint unit as claimed in claim 1 wherein said annular step connecting flange is welded to said outer surface of said cylindrical inner sleeve.

11. A flexible joint unit as claimed in claim 1 wherein said heat insulating means is a body of ceramic wool insulating material.

12. A flexible joint unit as claimed in claim 1 wherein said air gap has a gap width which is approximately one-sixth of the length of said elongated annular spaced wall section.

13. A flexible joint unit as claimed in claim 1 wherein said duct connecting end of said inner sleeve is welded to said hot gas duct.

14. A flexible joint unit as claimed in claim 1 wherein said outer flexible annular membrane is a heat resistant fabric-like flexible bellow.

15. A flexible joint unit as claimed in claim 1 wherein said outlet flexible annular connector has a cylindrical inner sleeve and an annular step connecting flange secured about an outer surface thereof, said inner sleeve having a duct connecting end securable about said circular hot gas duct and a free end; said step connecting flange having a short transverse connecting wall and an elongated annular spaced wall section extending from said connecting wall and disposed substantially parallel above said outer surface of said inner sleeve toward said duct connecting end of said inner sleeve and defining an air gap therebetween, a membrane connecting bracket extending above a free end of said spaced wall section connected with a side edge of said annular membrane thereabove, and a cylindrical coupling retained between said free ends of said annular sleeves of said inlet annular flexible wall structure and said outlet flexible annular connector.

16. A flexible joint unit as claimed in claim 15 wherein said duct connecting end of both said inner sleeves are provided with a transverse duct connecting flange.

17. A flexible joint unit as claimed in claim 15 wherein said cylindrical coupling is an L-shaped cross-section floating annular ring having a cylindrical horizontal wall and a transverse end wall, said floating annular ring being captively and movably retained across a gap between said free end of both said inner sleeves.

18. A flexible joint unit as claimed in claim 17 wherein said inner sleeve of said inlet annular flexible wall structure is provided with at least two spaced connecting fins secured to an inner surface thereof, said fins extending axially of said inner sleeve and in a gas flow direction, and a connecting gap defined between said inner surface and a spaced side edge of said connecting fins adjacent said free end, said horizontal wall of said annular ring being received in said connecting gap.

19. A flexible joint unit as claimed in claim 17 wherein said free end of said inner sleeve of said outlet flexible annular connector is provided with at least two inverted U-shaped clips secured thereto and spaced apart, each said clip having a vertically disposed slot for receiving said transverse end wall therein.

* * * * *